United States Patent [19]

Haeg et al.

[11] Patent Number: 5,533,403
[45] Date of Patent: Jul. 9, 1996

[54] LOADING ASSEMBLY FOR A VEHICLE SPINDLE TEST FIXTURE

[75] Inventors: Steven R. Haeg, Shorewood; Paul J. Leska, Sr., Coon Rapids; Ricky L. Zieman, Chaska, all of Minn.

[73] Assignee: MTS Systems Corporation, Eden Prairie, Minn.

[21] Appl. No.: 337,610

[22] Filed: Nov. 10, 1994

[51] Int. Cl.$^6$ .................................................. G01M 17/04
[52] U.S. Cl. ............................................ 73/669; 73/865.6
[58] Field of Search ............................ 73/118.1, 669, 73/865.6

[56] References Cited

U.S. PATENT DOCUMENTS

| | | | |
|---|---|---|---|
| 3,028,761 | 4/1962 | Cole, Jr. ........................... | 74/69 |
| 3,713,330 | 1/1973 | Lentz ................................ | 73/118.1 |
| 3,718,033 | 2/1973 | Petersen ........................... | 73/669 |
| 3,827,289 | 8/1974 | Borg .................................. | 73/669 |
| 4,263,809 | 4/1981 | Petersen et al. ................. | 73/118.1 |
| 4,567,782 | 2/1986 | Speicher et al. ................. | 74/96 |
| 4,658,656 | 4/1987 | Haeg ................................. | 73/669 |
| 4,733,558 | 3/1988 | Grenier ............................ | 73/669 |
| 4,798,088 | 1/1989 | Haeg et al. ...................... | 73/669 |
| 4,862,738 | 9/1989 | Jankowski ....................... | 73/118.1 |
| 4,977,791 | 12/1990 | Erichsen .......................... | 74/470 |
| 4,981,034 | 1/1991 | Haeg ................................. | 73/118.1 |
| 5,072,611 | 12/1991 | Budd et al. ...................... | 73/118.1 |
| 5,083,453 | 1/1992 | Daley ............................... | 73/118.1 |

FOREIGN PATENT DOCUMENTS

4320107A1  1/1994  Germany.

Primary Examiner—Richard Chilcot
Assistant Examiner—Eric S. McCall
Attorney, Agent, or Firm—Westman, Champlin & Kelly

[57] ABSTRACT

A loading assembly used to apply selected forces and moments to a vehicle spindle includes a wheel adapter housing mounted to the vehicle spindle. In a first embodiment, the loading assembly reduces crosstalk between application of lateral forces and unintended braking moments, and lateral forces and unintended longitudinal forces. In a second embodiment, a second loading assembly is adjustable so that braking moments are induced when a vertical force is applied when the loading assembly is used on trailing arm suspensions.

22 Claims, 8 Drawing Sheets

LOADING ASSEMBLY FOR A VEHICLE SPINDLE TEST FIXTURE

BACKGROUND OF THE INVENTION

The present invention relates to loading assemblies used for testing portions of a vehicle. More particularly, the present invention relates to a loading assembly for applying selected forces and moments to a vehicle spindle, the loading assembly being adaptable to various vehicle suspensions.

Many test fixtures have been advanced to apply forces and moments to a vehicle spindle in order to simulate driving or road conditions. These test fixtures often include separate actuators to apply vertical, longitudinal and lateral forces as well as braking moments to the vehicle spindle. U.S. Pat. Nos. 4,733,558 and 5,083,453 disclose two such test fixtures.

Commonly, the test fixtures include a wheel adapter housing that is mounted to the vehicle spindle in place of a wheel and tire assembly. Two vertical struts are joined to the perimeter of the wheel adapter housing and are used to transfer the longitudinal forces, the vertical forces and the braking moments to the vehicle spindle. A center downwardly projecting tang located between the vertical struts and also rigidly joined to the perimeter of the wheel adapter housing is joined to a lateral strut. An actuator is joined to the lateral strut and applies loads to the vehicle spindle that are generally perpendicular to the vertical struts.

Although the above-identified test fixtures are quite capable of applying longitudinal forces, vertical forces, lateral forces and braking moments to the vehicle spindle, some crosstalk which is the application of an unintended force in one direction through the application of an intended force in another direction exists. For example, when a lateral load is applied to the wheel adapter housing while the wheel adapter housing undergoes displacement about the vehicle spindle axis, an unintended braking moment is also developed. Similarly, an unintended longitudinal force is developed when a lateral load is applied to the wheel adapter housing with longitudinal displacement of the wheel adapter housing.

SUMMARY OF THE INVENTION

The present invention relates to a loading assembly used in vehicle spindle test fixtures to apply selected forces and moments to a vehicle spindle of a vehicle under test. In a first embodiment, the loading assembly includes a wheel adapter housing that is operably connected to a first actuator for applying forces along a first axis and a second actuator for applying a braking moment about an axis of the spindle, which is generally perpendicular to the first axis. A third actuator applies lateral forces to the wheel adapter housing. The loading assembly reduces crosstalk between forces applied in the lateral direction and unintended forces applied along the first axis, and forces applied in the lateral direction and unintended braking moments.

In a second embodiment, the loading assembly is adaptable to trailing arm suspensions wherein a brake axis rotation is developed simultaneously when a vertical displacement is applied. In a preferred form of this embodiment, a bell crank pivots on an axis to differentially displace two vertical struts which are attached to the wheel adapter housing in order to apply a braking moment. A lever pivotally supported about a second axis is pivotally joined to the bell crank and is used to displace the bell crank, the vertical struts and the wheel adapter housing to apply a vertical force. A control link controls rotation of the bell crank about the first axis and is pivotally joined to the bell crank about a third axis. A second lever is pivotally supported for movement about the second axis and is pivotally joined to an end of the control link about a fourth axis. When a trailing arm suspension is to be tested, the bell crank, the first lever, the control link and the second lever are arranged to form a non-parallelogram linkage in order to induce a brake axis rotation when a vertical displacement is applied. In a preferred embodiment, if desired, the bell crank, the first lever, the control link and the second lever can be arranged to form a parallelogram linkage so that a braking moment is not induced when a vertical force is applied.

DETAILED DESCRIPTION OF THE PREFERRED EMBODIMENTS

Figure 1:
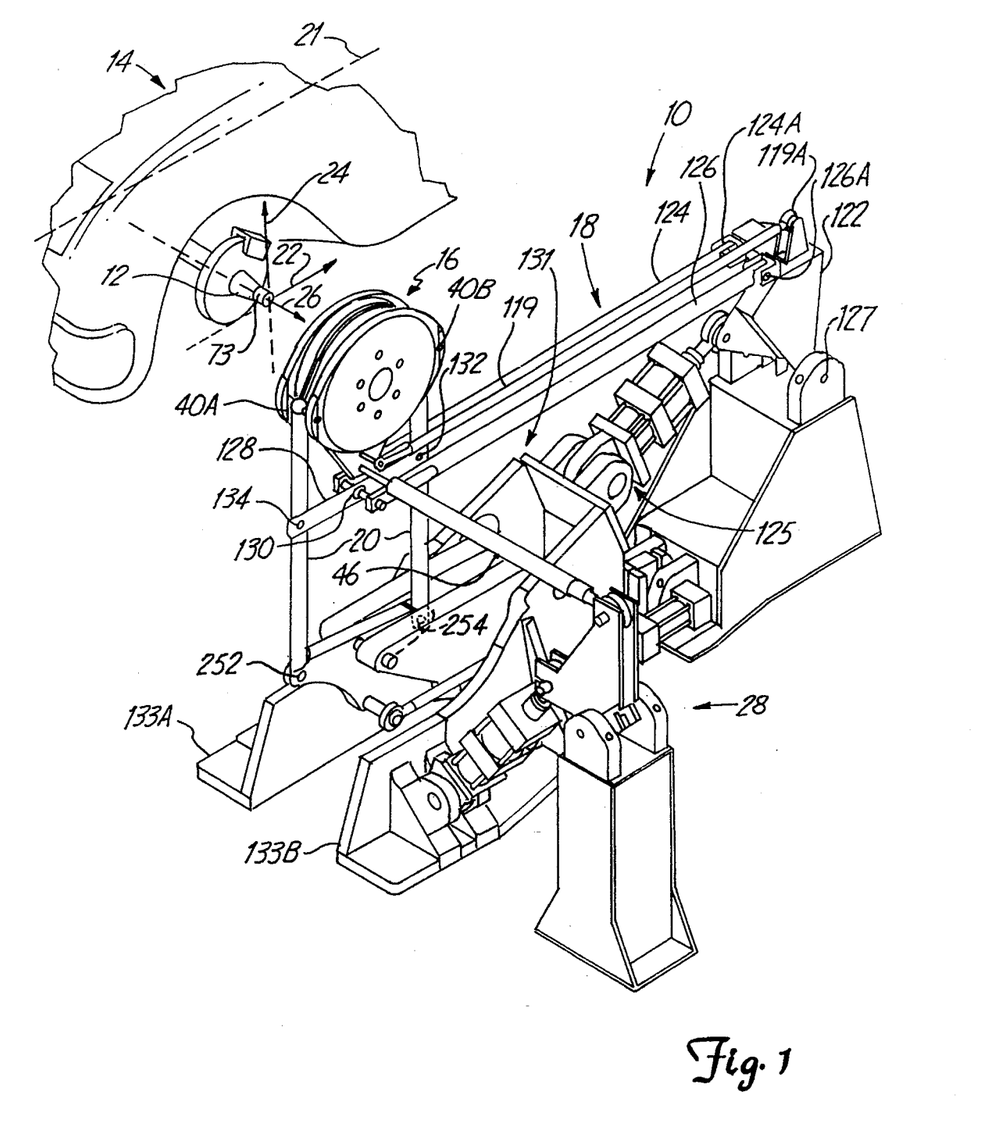
FIG. 1 is a perspective view of a vehicle spindle test fixture including a loading assembly of the present invention.

FIG. 1 illustrates a vehicle spindle test fixture generally at 10. The vehicle spindle test fixture 10 is designed for applying linear forces and rotational moments to a spindle 12 of a vehicle 14. The vehicle spindle test fixture 10 includes embodiment of a wheel adapter housing 16 that is suitably fixed to the vehicle spindle 12. A first loading assembly 18 is joined to the wheel adapter housing 16 using a pair of vertically extending loading links or struts 20. Generally, the first loading assembly 18 applies loads to the wheel adapter housing 16, and thus the spindle 12, in directions parallel to two mutually perpendicular axes 22 and 24. In addition, the first loading assembly 18 applies a rotational moment or torque about an axis 26 that is mutually perpendicular to axes 22 and 24. A second loading assembly is indicated at 28. The second loading assembly 28 applies a force to the wheel adapter housing 16 in a direction parallel to axis 26.

As used herein, the following definitions for forces and moments about the axes 22, 24 and 26 will apply:

A "longitudinal force" is a force applied to the wheel adapter housing 16 generally parallel to the axis 22, the axis 22 being parallel to a longitudinal axis 21 of the vehicle 14;

A "vertical force" is a force applied to the wheel adapter housing 16 generally parallel to the axis 24;

A "lateral force" is a force applied to the wheel adapter housing 16 generally parallel to the axis 26 and an axis of the spindle 12;

A "braking moment" is a moment applied to the wheel adapter housing 16 generally about the axis 26; and A "steer moment" is a moment applied to the wheel adapter housing 16 generally about the axis 24.

Figure 2:
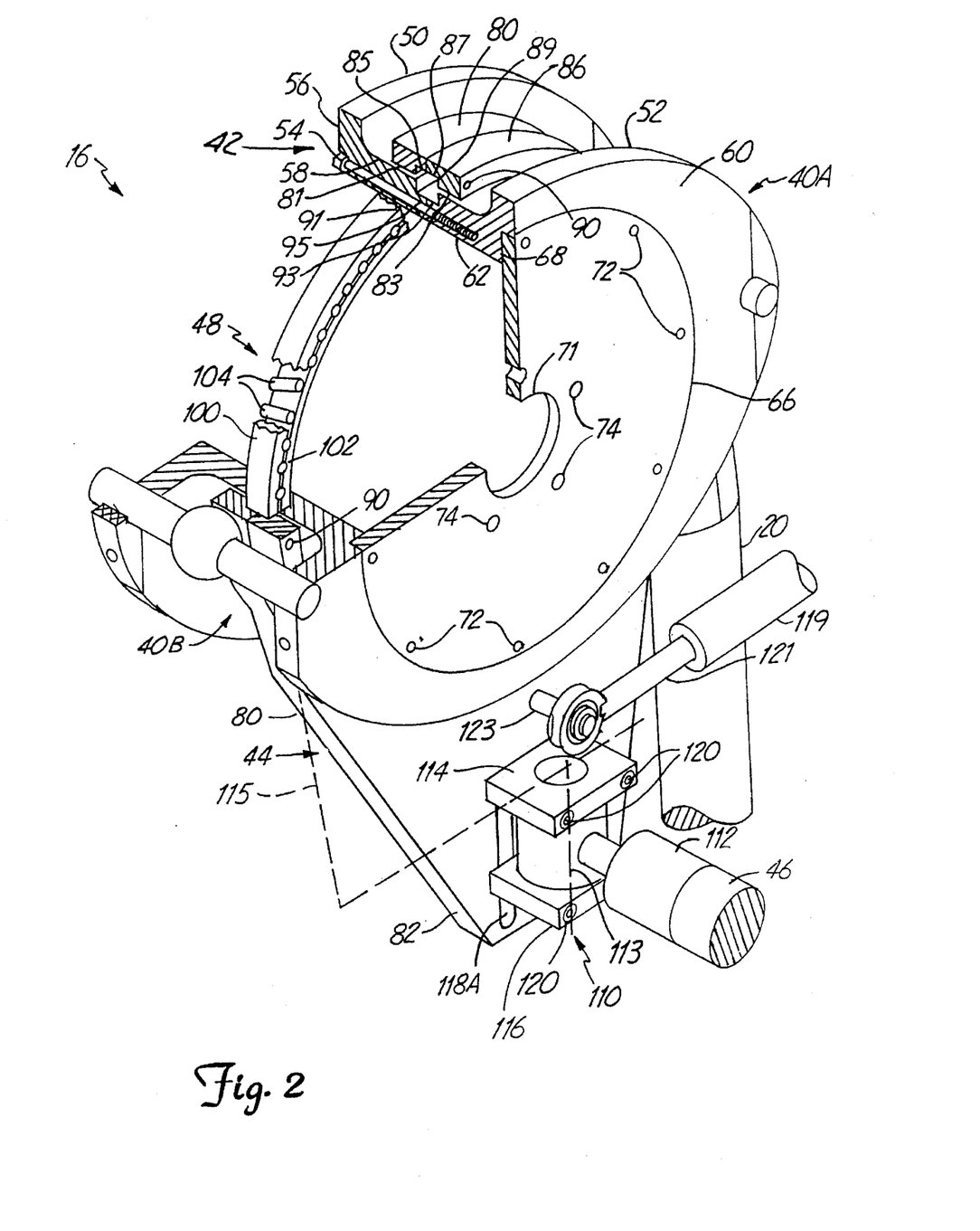
FIG. 2 is a perspective view of a first embodiment of a wheel adapter housing with parts in section and parts broken away.
Figure 3:
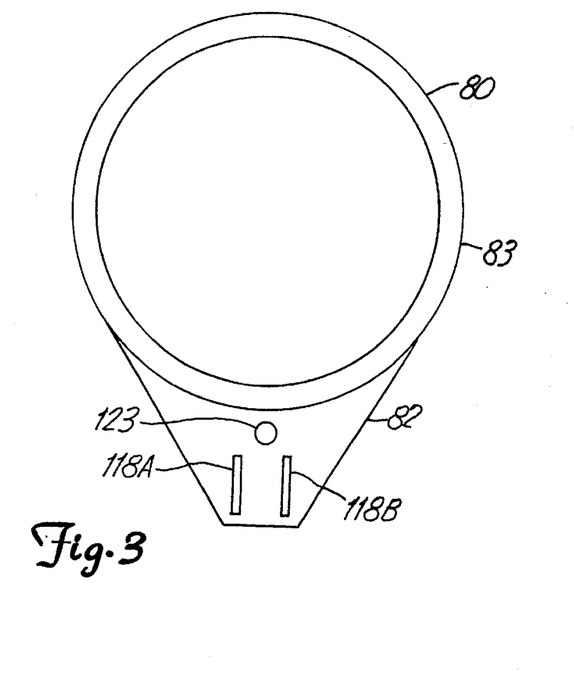
FIG. 3 is a front elevational view of a loading member for the wheel adapter housing illustrated in FIG. 2.

An enlarged view of the wheel adapter housing 16 is illustrated in FIG. 2. The wheel adapter housing 16 is mounted to the vertical struts 20 using suitable spherical joints indicated at 40A and 40B. The wheel adapter housing 16 includes a first loading member indicated at 42 that is secured to the vehicle spindle 12. Using the struts 20 and the first loading assembly 18 illustrated in FIG. 1, longitudinal forces, vertical forces and braking moments are applied directly to the first loading member 42, which in turn, are then applied to the vehicle spindle 12.

A second loading member 44 receives forces generally parallel to the axis 26 from a lateral strut 46. In the embodiment illustrated in FIG. 2, a bearing assembly 48 joins the second loading member 44 to the first loading member 42. The bearing assembly 48 is substantially rigid for forces applied to the second loading member 44 that are parallel to the axis 26 in order to transfer these forces to the first loading member 42, while allowing movement of the second loading member 44 relative to the first loading member 42 for braking moments and longitudinal forces applied to the first loading member 42. Since the second loading member 44 is able to move relative to the first loading member 42, the magnitude of unintended braking moments or unintended longitudinal forces with application of lateral forces is reduced.

In the embodiment illustrated in FIG. 2, the first loading member 42 includes two end sections 50 and 52. The end section 50 includes an outwardly facing flange portion 56 and a cylindrically extending portion 58 joined to the extending flange portion 56 and preferably made integral therewith. The end section 52 is similar having an outwardly facing flange portion 60 and an integral cylindrically extending portion 62. A plurality of bolts, one of which is indicated at 54, joins the extending portion 58 of the end section 50 to the extending portion 62 of the end section 52. A mounting plate 66 is disposed in an inner annular recess 68 of the end section 52 and is secured thereto with a plurality of suitable bolts 72. The mounting plate 66 includes a center aperture 71 for receiving a center portion 73 of the spindle 12. Apertures 74 located around the center aperture 71 receive lugbolts, not shown, present on the spindle 12. The lugbolts are used to secure the wheel adapter housing 16 to the spindle 12.

The second loading member 44 includes a first support collar indicated at 80 having an extending plate portion 82, and a second support collar 86. A plurality of bolts indicated at 90 fasten the first support collar 80 to the second support collar 86. As illustrated, inner diameters of the support collars 80 and 86 are slightly larger than the outer diameters of the outer surfaces of extending portions 58 and 62 so that annular gaps 81 and 83 are formed therebetween. Each support collar 80 and 86 includes an L-shaped annular recess 85 and 87, respectively. When the support collars 80 and 86 are secured together the recesses 85 and 87 form a channel 89 facing the extending portions 58 and 62. The extending portions 58 and 62 also include L-shaped annular recesses 91 and 93, respectively. Accordingly, when the end sections 50 and 52 are joined together, the annular recess 91 and 93 form a channel 95 facing the channel 89.

The bearing assembly 48 mounts within the channels 89 and 95 wherein an outer bearing race 100 is mounted in the channel 89 and a inner bearing race 102 is mounted within the channel 95. Specifically, the end sections 50 and 52 are clamped to the inner bearing race 102 with bolts 54, while the support collars 80 and 86 are clamped to the outer bearing race 100 with bolts 90. Suitable bearing elements indicated at 104 are provided and allow relative rotational movement of the races 100 and 102. The bearing assembly 48 acts as a thrust bearing transferring lateral forces received by the second loading member 44 to the first loading member 42, while allowing the second loading member 44 to rotate freely about the first loading member 42 when longitudinal forces or braking moments are applied.

An adjustable coupling assembly indicated at 110 transfers lateral forces from the lateral strut 46 to the extending plate 82 of the support collar 80. A suitable rod end 112 mounted to the end of strut 46 is pinned, and pivots between plates 114 and 116 of the adjustable coupling assembly 110. Fasteners 120 project through vertical slots 118A and 118B (FIG. 4) provided in the extending plate 82 and secure the plates 114,116 and the rod end 112 at a selected radial distance from the axis of the spindle 12 when the wheel adapter housing 16 is mounted thereto. By adjusting the position of the adjustable coupling assembly 110 on the extending plate 82, the wheel adapter housing 16 can emulate wheel and tire assemblies of various diameters.

Figure 4:
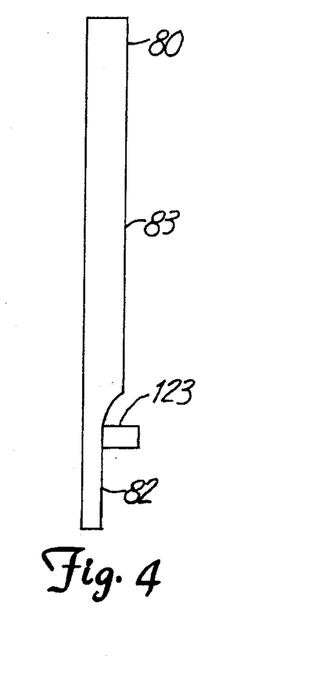
FIG. 4 is a side elevational view of the loading member of FIG. 3.

Preferably, as illustrated in FIG. 4, the extending plate 82 is thinner than, or offset from, an annular portion 83 that encircles the extending portion 58 of the end section 50. By making the extending plate 82 thinner or offset, symmetry is established in the wheel adapter housing 16 so that a pivot axis 113 of rod end 112 is located in a center plane 115 of the wheel adapter housing 116. By locating the pivot axis 113 in the center of plane 115, proper emulation of a tire contact patch with a road surface is achieved.

An idler or stabilizing strut indicated at 119 in FIGS. 1 and 2 is pivotally connected between the extending plate 82 and a lever 122 of the first loading assembly 18. As illustrated in FIG. 2, the idler strut 119 includes a suitable rod end 121 that is pivotable about a shaft 123 joined to the extending plate 82. A servo controlled hydraulic actuator 125 is joined to the lever 122 and pivots the lever 122 about a pivot shaft 127 to develop the longitudinal forces. It should be understood that although hydraulic actuators are depicted and described in this embodiment and the embodiments below, other suitable actuators such as pneumatic and electric actuators can also be used. The actuator 125 is pivotally supported on a frame 131 having support legs 133A and 133B. The longitudinal forces are transferred to the wheel adapter housing 16 through longitudinal struts 124 and 126 which are connected to a cross beam 128 through a suitable spherical joint 130. The cross beam 128 is in turn connected to each of the vertical struts 20 using suitable spherical joints indicated at 132 and 134. The idler strut 119 helps maintain the lateral input point (adjustable coupling assembly 110) for the extending plate 82 of the support collar 80 below the axis of the spindle 12 during longitudinal displacement of the wheel adapter housing 16. The idler strut 119 also reacts the longitudinal forces induced when lateral forces are applied during longitudinal displacement of the wheel adapter housing 16 due to the plan view angle between the lateral input strut 46 and the wheel adapter housing 16. If an idler pivot 119A, longitudinal input lever pivots 124A and 126A, and pivot shaft 127 on lever 122 are positioned from one another to mimic pivots 40A and 40B, pivots 132 and 134 and pivots 252 and 254 (discussed below), on the vertical struts 20, respectively, the crosstalk problems (position errors) between longitudinal displacement and the longitudinal position of the lateral input strut 46 are minimized.

Figure 5:
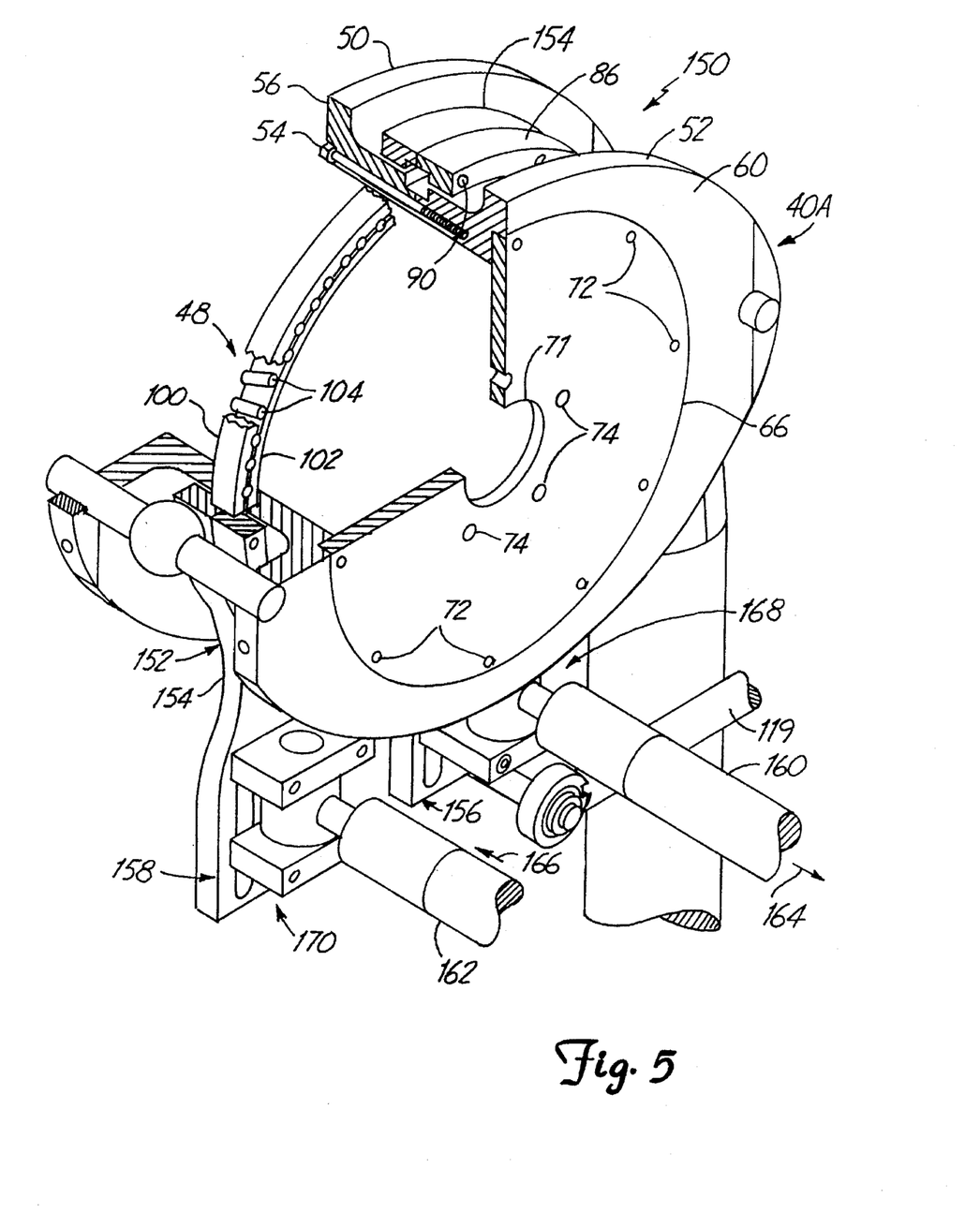
FIG. 5 is a perspective view of a second embodiment of a wheel adapter housing with parts in section and parts broken away.

A second embodiment of a wheel adapter housing 150 is illustrated in FIG. 5. The wheel adapter housing 150 is similar to the wheel adapter housing 16 described above wherein like reference numbers have been used to identify identical elements. In addition to receiving and applying lateral forces generally parallel to the axis 26, the wheel adapter housing 150 transmits steering moments to the spindle 12. The wheel adapter housing 150 includes a second loading member 152 having a first support collar 154 with two extending portions illustrated at 156 and 158. Each extending portion 156 and 158 receives lateral forces transmitted through corresponding lateral struts 160 and 162, respectively. The first support collar 154 is secured to the second support collar 86 and the bearing assembly 48 as described above. A steering moment is transmitted to the spindle 12 when opposed lateral forces, for example as indicated by arrows 164 and 166, are transmitted through the struts 160 and 162, the opposed lateral forces being generated from a suitable actuator assembly, not shown.

Figure 6:
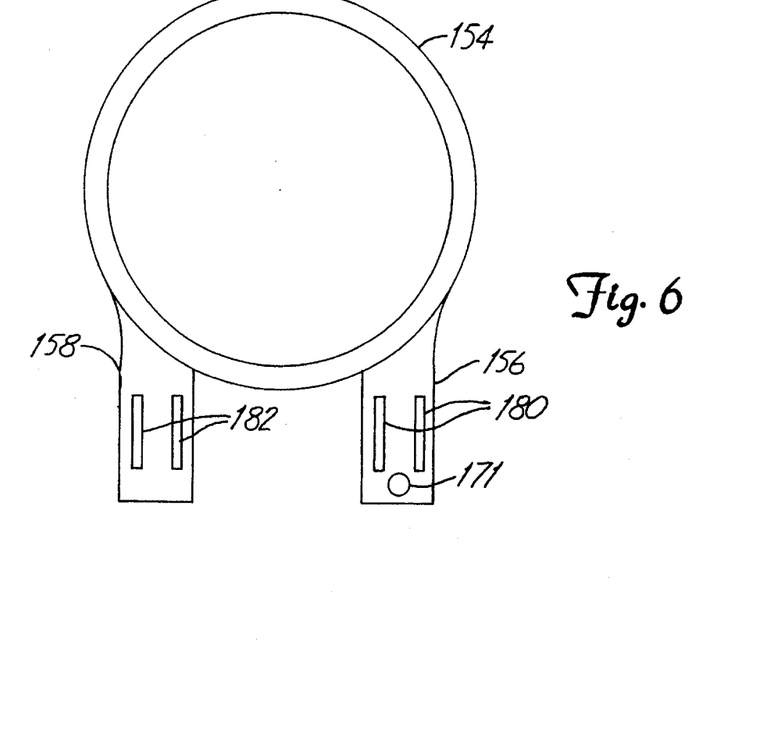
FIG. 6 is a front elevational view of a loading member for the wheel adapter housing illustrated in FIG. 5.

The first support collar 154 is illustrated in FIG. 6. Adjustable coupling assemblies 168 and 170 similar to the adjustable coupling assembly 110 described above attach the struts 160 and 162, respectively, to the first support collar 154. Slots 180 and slots 182 provided in the extending portions 156 and 158, respectively, allow the positions of the adjustable coupling assemblies 168 and 170 to be adjusted relative to the axis of spindle 12. As illustrated in FIG. 5, the idler strut 119 is attached to the extending portion 156 using a mounting shaft 171.

Figures 7, 9:
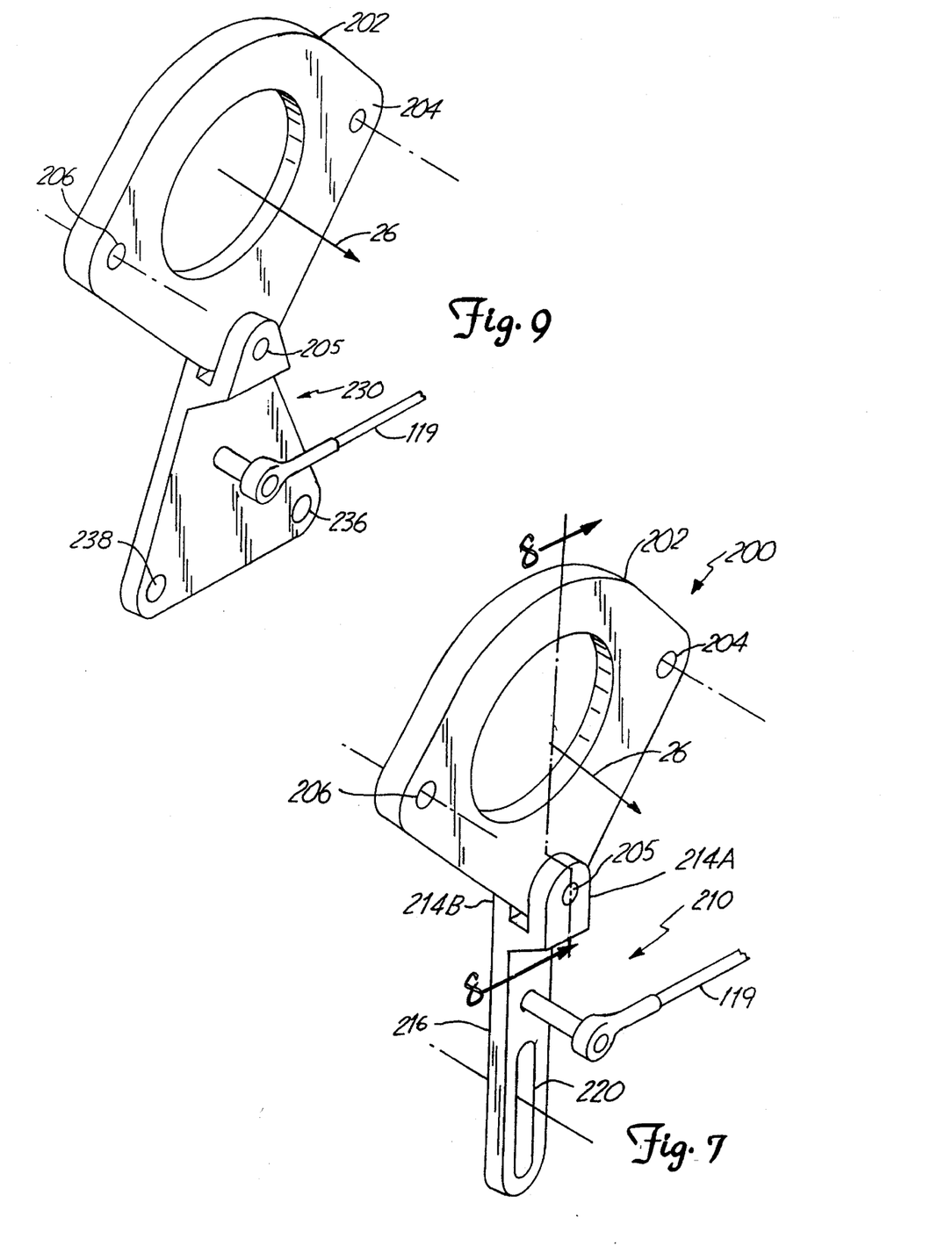
FIG. 7 is a schematic perspective view of a third embodiment of a wheel adapter housing.
FIG. 9 is a perspective view of a fourth embodiment of a wheel adapter housing.
Figure 8:
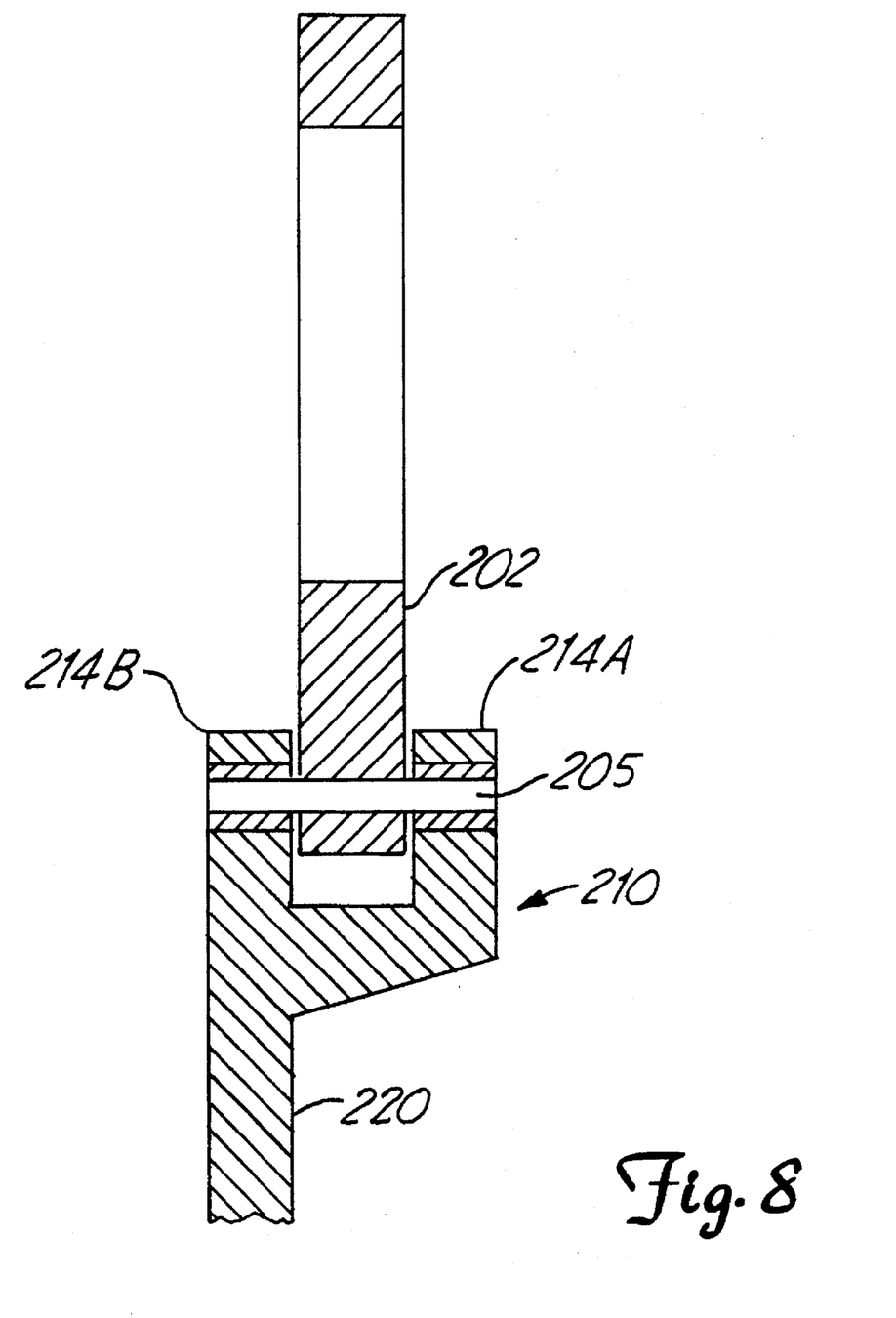
FIG. 8 is a sectional view of the third embodiment taken along lines 8—8 of FIG. 7.

A third embodiment of the wheel adapter housing 200 is illustrated in FIGS. 7 and 8. The wheel adapter housing 200 is schematically illustrated in these Figures and includes a first loading member indicated at 202 that is attached to the vertical struts with suitable spherical bearings mounted at opposed ends 204 and 206. As with the previous wheel adapter housings described above, the first loading member 202 receives longitudinal forces, vertical forces and braking moments from the vertical struts, and transfers these loads directly to the vehicle spindle 12.

A second loading member indicated at 210 is pivotally attached to the first loading member 202 with a suitable pivot pin 205. The second loading member 210 includes flanges 214A and 214B that extend over opposed surfaces of the first loading member 202. A support portion 216 extends away from the flanges 214A and 214B and includes a slot 220. The lateral strut 46 illustrated in FIG. 2 is joined to the second loading member 210 with a suitable pivot connection using the slot 220. The slot 220 allows the coupling of the lateral strut 46 with the second loading member 210 to be adjusted in order to emulate wheel and tire assemblies of various diameters.

If steer forces are desired, a second loading member 230 illustrated in FIG. 9 can be used. The second loading member 230 also includes flanges 232A and 232B that extend over opposed surfaces of the first loading member 202. The pivot pin 205 joins the second loading member 230 to the first loading member 202 and allows limited pivoting movement therebetween. The lateral struts 160 and 162 illustrated in FIG. 5 are joined at spaced apart locations 236 and 238, respectively, so as to develop the desired steer moments. As with the embodiments of FIGS. 1, 2 and 5, the idler strut 119 is connected to the lever 122 of the first loading assembly and maintains the input of the lateral force below axis 26. The embodiment of FIGS. 7, 8 and 9 illustrate that crosstalk between the lateral forces and braking moments, and the lateral forces and longitudinal forces can also be reduced by the use of the pivot pin 205 that is spaced-apart from the axis 26 or the axis of the vehicle spindle.

Figure 10:
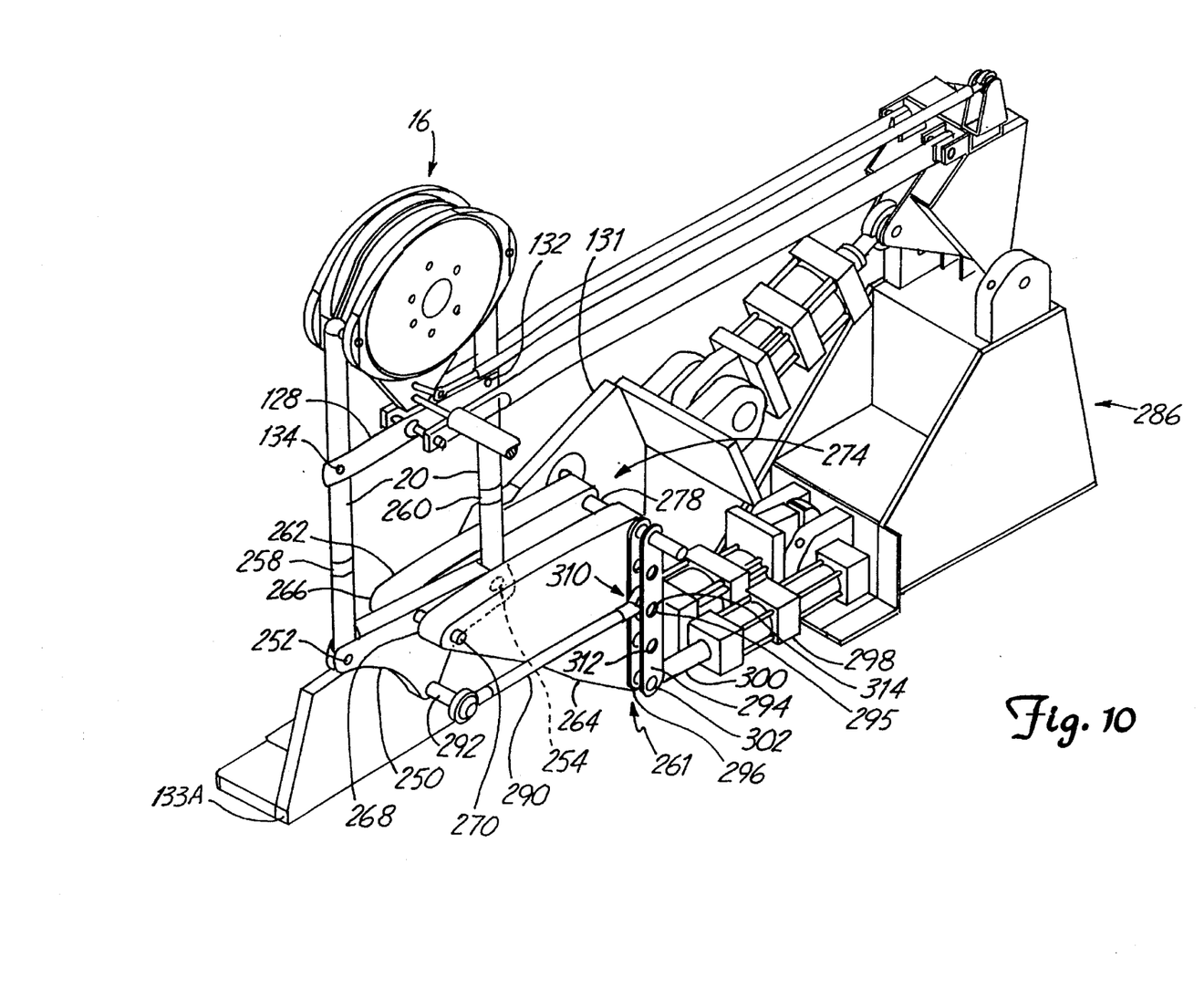
FIG. 10 is a perspective view of the embodiment of FIG. 1 with parts broken away.

Another aspect of the present invention is the ability to simulate trailing arm suspensions. Referring to FIG. 10, wherein the second loading assembly 28 has been removed for clarity. A braking moment is applied to the wheel adapter housing 16 through a differential movement of the vertical struts 20. Specifically, the lower end of the vertical struts 20 are joined with a delta-shaped (triangular) bell crank 250. The struts 20 are connected to the bell crank 250 at suitable pivots 252 and 254. The pivots 252 and 254 are spaced in a longitudinal direction to be equal to the pivots 132 and 134 of the cross beam 128 and the pivots of the wheel adapter housing 16 so that the struts 20 are substantially straight. Load cells 258 and 260 are provided in each strut 20 to directly measure forces transmitted therethrough.

The bell crank 250 is movable in a vertical direction to apply vertical loads simultaneously to both of the vertical struts 20. The bell crank 250 is mounted on a bell crank arm assembly 261 which comprises two spaced-apart plates 262 and 264 that move as a unit. The plates 262 and 264 have outer ends 266 and 268, respectively, that are connected with a pin 270 that passes through the center of the bell crank 250. The bell crank arm assembly 261 in turn has an actuating arm portion 274 and is supported on the frame member 131 with a pivot pin 278. It should be understood that the bell crank 250 and plates 262 and 264 do not contact support legs 133A or 133B (FIG. 1).

Figure 11:
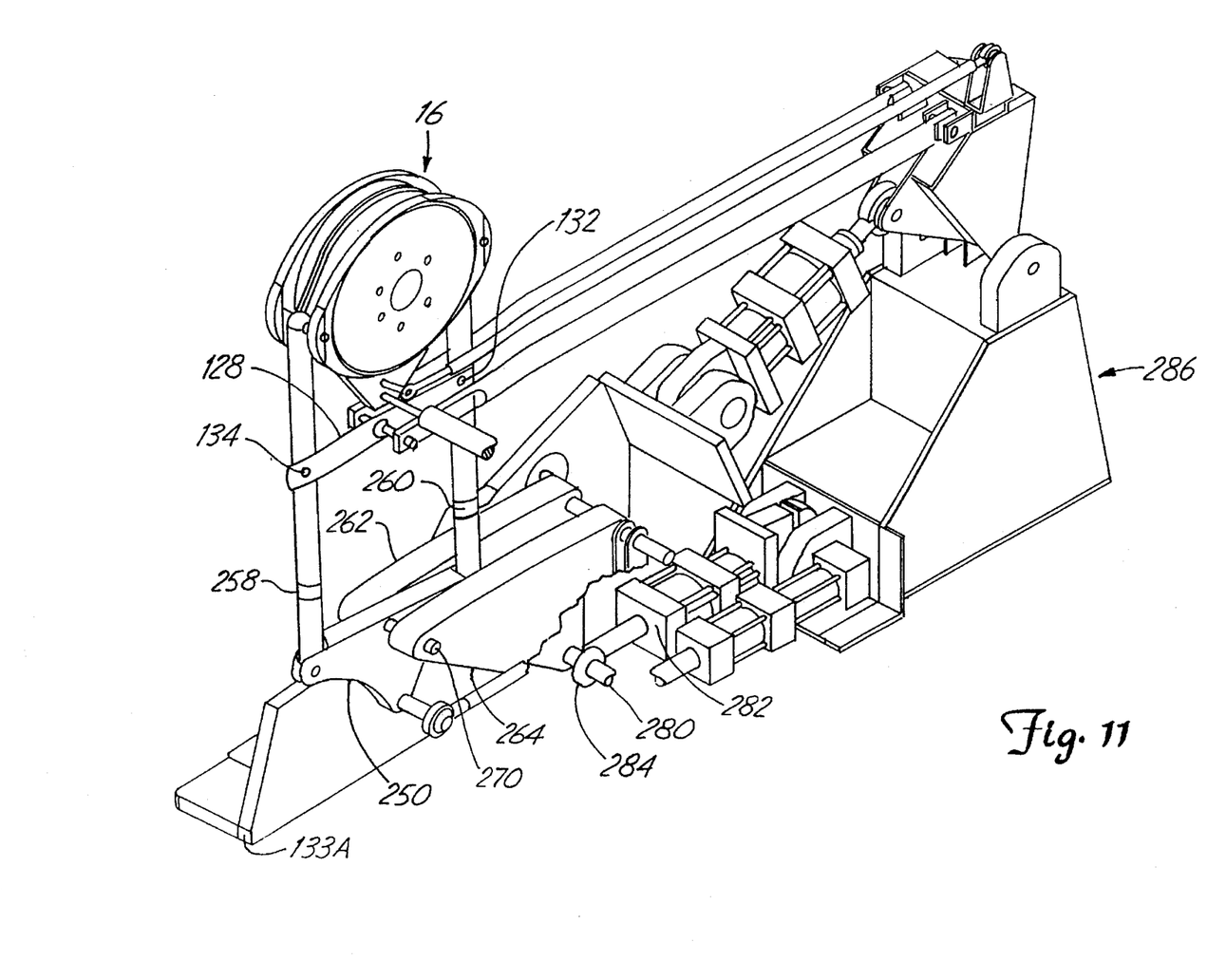
FIG. 11 is a perspective view of the embodiment of FIG. 1 with parts broken away.

Referring to FIG. 11, the plates 262 and 264 are joined together with a shaft 280. A vertical actuator 282 is pivotally joined to the shaft at a rod end 284. The actuator 282 is a double acting, servo-controlled hydraulic actuator and has its base end connected to a support pedestal 286. Extension and retraction of the rod of actuator 282 causes rotation of the bell crank arm assembly 261 about the pin 270 and thus the bell crank 250 to move in a vertical direction to load both struts 20 and in turn apply loads to the wheel adapter housing 16.

A braking moment is applied to the wheel adapter housing 16 by pivoting the bell crank 250 about its pivot pin 270 and causing differential vertical movement of the vertical struts 20 through movement of a control link 290. The control link 290 is pivotally connected with pivot pin 292 to a lower end of the bell crank 250. At an end opposite bell crank 250, the control link 290 is pivotally joined to an actuator lever 294 with pin 295. The actuator lever 294 has one end 296 pivotally mounted on the same pivot axis as the bell crank arm assembly 261, or in other words, on the pivot pin 278. The lever 294 is mounted to have independent pivotal movement relative to the bell arm crank assembly 261.

The lever 294 is controlled with a servo-controlled hydraulic actuator 298 that has an extendable and retractable rod 300. An outer end of rod 300 is connected to the lever 294 with a pivot pin 302. A base end of the actuator 298 is connected to the pedestal 286. Upon movement of the actuator rod 300, the lever 294 will cause displacement of the control link 290 and pivotal movement of the bell crank 250 about pivot pin 270, which in turn, causes one of the vertical struts 20 to move upwardly while the other vertical strut moves downwardly.

The system described above is versatile in that it can be used to test various types of suspensions including trailing arm suspensions. Unlike other forms of suspensions, trailing arm suspensions induce a braking moment with application of a vertical force. In a first embodiment, a brake axis rotation is induced when a vertical displacement is applied by making a non-parallelogram linkage of elements between the pivot pins 270 and 278 of the bell crank arm assembly 261 and the pivot pins 292 and 295 of the control link 290. As illustrated in FIG. 10, the lever 294 includes a plurality of mounting apertures 310 for the pivot pin 295 of the control link 290. For example, to simulate a trailing arm suspension, the pivot pin of control link 290 can be moved to mounting aperture 312. If a non-trailing arm suspension is to be tested, the control link 290 is moved to aperture 314 so as to establish a parallelogram linkage between pivot 270, 278, 292 and 295.

It should be understood that use of the lever 294 with mounting apertures 310 is but one embodiment for simulating trailing arm suspensions. Alternatively, the control link 290 can be adjustable in length so as to adjust the distance between pivot pins 292 and 295. Likewise, the length of any elements between pivot pins 270, 278, 292 and 295 can be made adjustable. In another embodiment, the actuator 298 can have an adjustable zero point so that, for example, if a trailing arm suspension is to be tested, a zero point is established so that the rod 290 is slightly retracted and when a vertical force is applied to lift the bell crank 250, the actuator 298 is maintained at the zero point thereby causing pivotal movement of the bell crank 250 with vertical displacement of the bell crank 250.

Although the present invention has been described with reference to preferred embodiments, workers skilled in the art will recognize that changes may be made in form and detail without departing from the spirit and scope of the invention.

What is claimed is:

1. A loading apparatus used in a vehicle spindle test fixture to apply selected forces and moments to a vehicle spindle having a vehicle spindle axis, the loading apparatus comprising:

a first loading member securable to the vehicle spindle for receiving and transferring a braking moment to the vehicle spindle about the vehicle spindle axis, a first force parallel to a first axis that is perpendicular to the vehicle spindle axis, and a second force parallel to a second axis that is perpendicular to the first axis and the vehicle spindle axis;

a second loading member for receiving forces generally parallel to the vehicle spindle axis; and means for joining the second loading member to the first loading member whereby the first loading member and the second loading member are directly coupled to each other, said means being rigid for forces applied to the second loading member parallel to the vehicle spindle axis in order to transfer said forces to the first loading member while allowing movement of the second loading member relative to the first loading member for braking moments applied to the first loading member and for longitudinal forces applied to the first loading member parallel to one of the two perpendicular axes.

2. The loading apparatus of claim 1 wherein the means for joining allows pivotal movement of the second loading member relative to the first loading member.

3. The loading apparatus of claim 2 wherein an axis of pivotal movement of the second loading member relative to the first loading member is spaced-apart from the vehicle spindle axis.

4. The loading apparatus of claim 2 wherein an axis of pivotal movement of the second loading member relative to the first loading member is the vehicle spindle axis.

5. The loading apparatus of claim 3 wherein means for joining comprises a pivot pin joining the second loading member to the first loading member.

6. The loading apparatus of claim 4 wherein the means for joining comprises a bearing assembly.

7. The loading apparatus of claim 6 wherein the bearing assembly includes a first bearing race joined to the first loading member, a second bearing race joined to the second loading member and a plurality of bearings interposed between the first bearing race and the second bearing race.

8. The loading apparatus of claim 6 wherein the first loading member comprises a plate portion fastened to the vehicle spindle and a cylindrical portion extending outwardly from the plate portion and about the vehicle spindle axis, and wherein the bearing assembly includes a bearing race joined to the cylindrical portion.

9. The loading apparatus of claim 2 and means for adjustably fixing application of forces parallel to the vehicle spindle axis to the second loading member.

10. The loading apparatus of claim 9 wherein the means for adjustably fixing application of forces to the second loading member comprises a slot formed in the second loading member.

11. The loading apparatus of claim 2 and force applying means joined to the second loading member for applying a steering moment to the vehicle spindle.

12. A loading apparatus used in a vehicle spindle test fixture to apply forces to a vehicle spindle having a vehicle spindle axis, the loading apparatus comprising:

a first loading member securable to the vehicle spindle for receiving and transferring a first force to the vehicle spindle parallel to a first axis that is perpendicular to the vehicle spindle axis, and a second force to the vehicle spindle parallel to a second axis that is perpendicular to the first axis and the vehicle spindle axis;

a second loading member for receiving and transferring a force parallel to the vehicle spindle axis; and means for connecting the first loading member to the second loading member to transfer the force parallel to the vehicle spindle axis to the first loading member and allowing at least partial rotation of the second loading member about the first loading member.

13. The loading apparatus of claim 12 wherein the means for connecting comprises a pivot pin.

14. The loading apparatus of claim 13 wherein the means for connecting comprises a bearing assembly.

15. The loading apparatus of claim 14 wherein the bearing assembly includes a first bearing race joined to the first loading member, a second bearing race joined to the second loading member and a plurality of bearings interposed between the first bearing race and the second bearing race.

16. The loading apparatus of claim 15 wherein the first loading member comprises a plate portion fastened to the vehicle spindle and a cylindrical portion extending outwardly from the plate portion and about the vehicle spindle axis, and wherein the first bearing race is joined to the cylindrical portion.

17. The loading apparatus of claim 16 wherein the second loading member includes an extending portion through which forces parallel to the vehicle spindle axis are transferred to the vehicle spindle.

18. A loading apparatus used in a vehicle spindle test fixture to apply selected forces and moments to a vehicle spindle having a vehicle spindle axis, the loading apparatus comprising:

a first loading member securable to the vehicle spindle for receiving and transferring a first force to the vehicle spindle parallel to a first axis that is perpendicular to the vehicle spindle axis, and a second force to the vehicle spindle parallel to a second axis that is perpendicular to the first axis and the vehicle spindle axis;

a pair of first struts connected to the first loading member;

at least one second strut pivotally connected to the pair of first struts between the first loading member and remote ends of the pair of first struts;

a lever pivotally connected to the second strut remote from the pair of first struts, the lever and the second strut being connected to displace the first loading member in a direction generally perpendicular to the vehicle spindle axis;

a first actuator connected to the lever;

a second loading member for receiving and transferring forces generally parallel to the vehicle spindle axis; and means for connecting the first loading member to the second loading member to transfer said forces parallel to the vehicle spindle axis to the first loading member and allowing at least partial rotation of the second loading member about the first loading member.

19. The loading apparatus of claim 18 wherein the means for connecting comprises a pivot pin.

20. The loading apparatus of claim 18 wherein the means for connecting comprises a bearing assembly.

21. The loading apparatus of claim 18 and further comprising a third strut connected to the lever and the second loading member.

22. The loading apparatus of claim 18 and a bell crank pivotally connected to the remote ends of the pair of first struts, and a second actuator connected to the bell crank to rotate the bell crank and differentially displace the pair of first struts in order to rotate the first loading member about the vehicle spindle axis.

* * * * *